United States Patent [19]
Delhaes

[11] 4,394,024
[45] Jul. 19, 1983

[54] SEAL FOR USE WITH PIPES TO BE FITTED ONE INTO ANOTHER WITH SPIGOT AND SOCKET ENDS

[75] Inventor: Johannes C. Delhaes, Voerendaal-Ten Esschen, Netherlands

[73] Assignee: Rubber-en Kunststoffabriek ENBI B.V., Netherlands

[21] Appl. No.: 269,718

[22] Filed: Jun. 2, 1981

[30] Foreign Application Priority Data

Jun. 4, 1980 [NL] Netherlands ............. 8003258

[51] Int. Cl.³ .................. F16J 15/10; F16L 21/00
[52] U.S. Cl. ................. 277/207 A; 285/379; 285/345
[58] Field of Search ........... 285/379, 231, 345, 110; 277/207 A

[56] References Cited

U.S. PATENT DOCUMENTS

| 2,547,394 | 4/1951 | Hynes et al. | 285/379 |
| 2,586,950 | 2/1952 | Hynes | 285/379 |
| 3,430,989 | 3/1969 | Wendt | 277/207 A |
| 3,432,175 | 3/1969 | Kawai | 277/207 A |
| 4,034,994 | 7/1977 | Ohta et al. | 277/207 A |

Primary Examiner—Robert I. Smith
Attorney, Agent, or Firm—Scully, Scott, Murphy & Presser

[57] ABSTRACT

A seal for use with pipes to be inserted one into another with spigot and socket ends, comprising a sealing sleeve made of an elastomeric material and arranged in the socket, wherein the sleeve is provided with a radially resilient element, the arrangement being such that, after being mounted in the socket, the seal is clamped in the socket by the radial resilience of said element.

6 Claims, 9 Drawing Figures

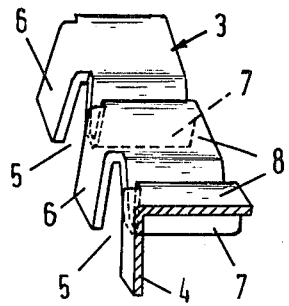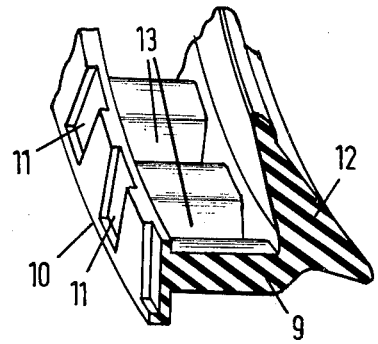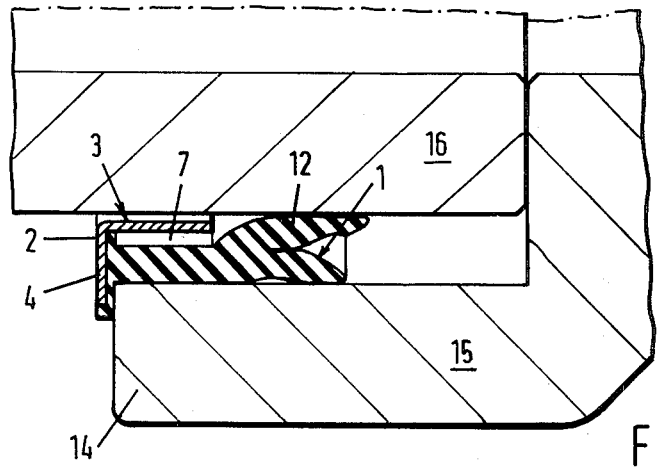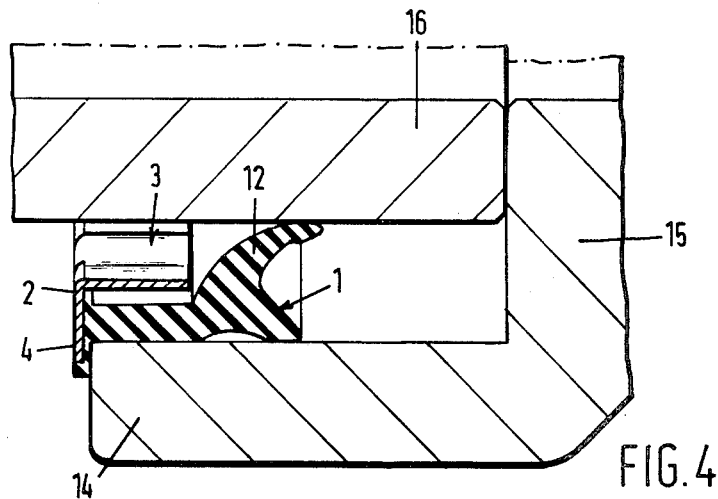

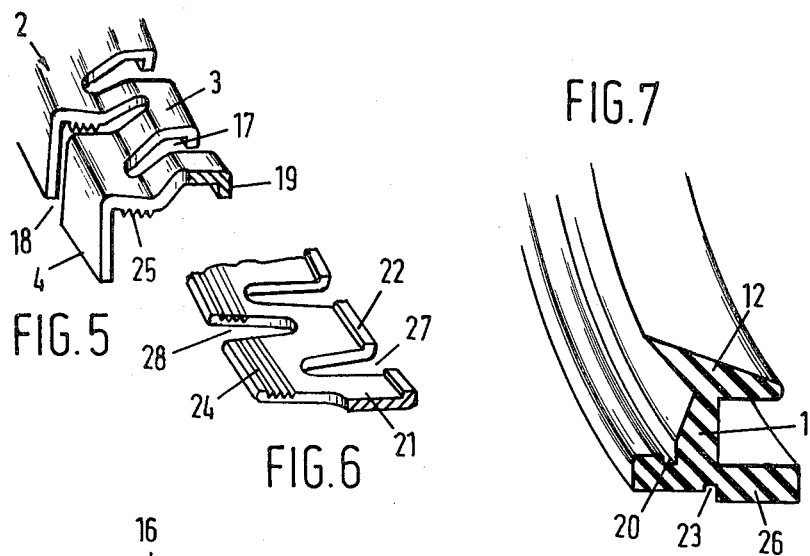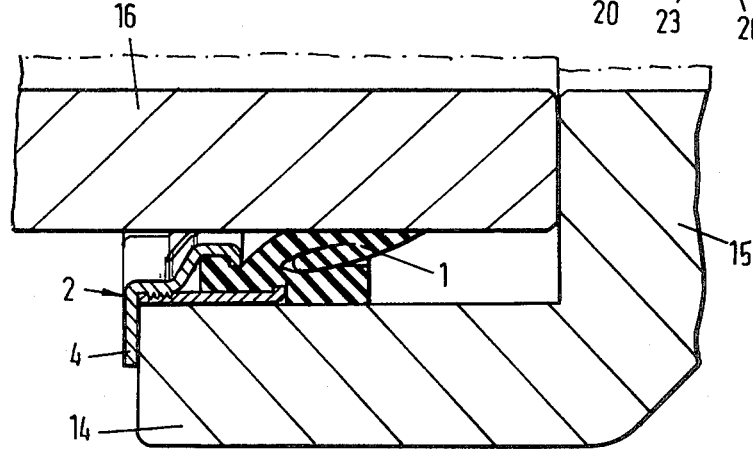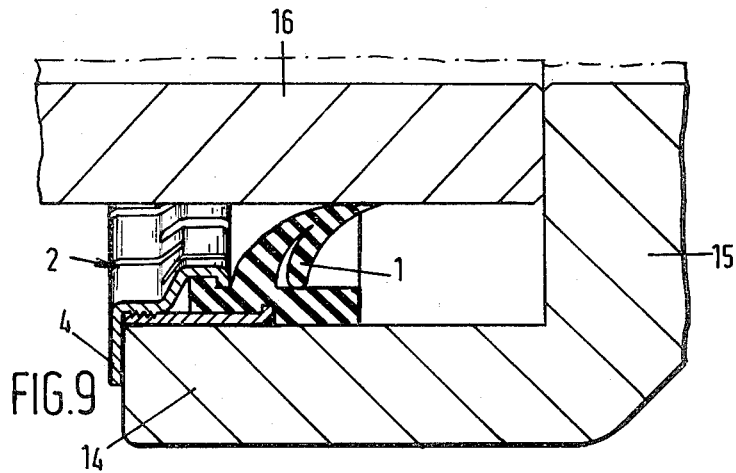

SEAL FOR USE WITH PIPES TO BE FITTED ONE INTO ANOTHER WITH SPIGOT AND SOCKET ENDS

This invention relates to a seal for use with pipes to be fitted one into another with spigot and socket ends, comprising a sealing sleeve made of an elastomeric material and arranged in the socket.

By pipes to be fitted one into another with spigot and socket ends are understood in this specification all pipes which can be coupled to make pipe joints in which one pipe end (spigot end) can be inserted into a wider pipe portion (socket). This socket may be the widened end or a side-branch of another pipe, or an auxiliary member, such as a coupling socket or a tee piece, to which two or more pipes can be connected.

In order to prevent that, in making connections, such as in a sewerage system, difficulties are overcome by removing the sealing sleeve, thereby to facilitate making the connection, it has been prescribed that the removal of the sleeve from the socket should require a certain minimum force (DIN 1230). In order to achieve this, the sleeve is fixed in the socket by means of an adhesive, or by means of a thermosetting moulding composition provided between the socket and the sleeve. Both methods are rather labour-intensive and hence expensive. The use of an adhesive has the additional disadvantage that the sleeve must be previously subjected to a treatment with a corrosive material, such as sulphuric acid, to make the material of the sleeve suitable for being fastened with adhesive.

Furthermore, in pipes that can be made with a small dimensional tolerance, such as pipes of synthetic plastics material, it is known to fix the sleeve by means of a snap ring engaging around the socket.

The present invention provides a construction in which the sleeve is properly anchored within the socket without this requiring additional operations, such as glueing or casting a thermosetting composition.

For this purpose the sleeve is provided with an element that is resilient in the radial direction, the arrangement being such that, after being mounted within the socket, the seal is clamped in the socket by the radial resilience of said element.

When the seal is mounted in the socket, the resilient element is elastically depressed, so that after the assembly the seal is always under a radial bias in the socket. The dimensions of the element are selected so that, even in case the socket has the maximum inside diameter in connection with the dimensional tolerance used in the manufacture of the pipes, the radial bias is still so high that the frictional resistance that must be overcome to remove the sleeve from the socket exceeds the force prescribed as a minimum in the prescriptions.

The resilient element preferably consists of a bushing provided with corrugations or cuts extending parallel to the axis of the bushing. This constructions has the advantage of ensuring proper centering of the pipes during the coupling operation. Even in coupling heavy pipes, the force required for the assembly is relatively small, by virtue of the fact that during the insertion of the spigot end of one tube into the socket of the other tube, the spigot end slides over the inner surface of the bushing.

The bushing is preferably provided with a collar divided into segments by cuts extending throughout the entire width of the collar. This makes it possible for the seal to be mounted mechanically, with the collar serving on the one hand as a bearing surface for the punch of a press, and as an abutment for limiting the distance over which the seal is forced into the socket, and on the other hand preventing the seal from being taken along by the spigot end of a pipe as the latter is inserted into the socket.

In this embodiment the sealing sleeve is preferably provided with a flange in which recesses have been formed for receiving the segments of the collar of the bushing.

When a corrugated bushing is used, the cuts in the collar may extend in radial planes containing the apexes of the outward corrugations. The segments into which the collar has been divided by the cuts are then in contact with the connecting portion between these corrugations. When the bushing is provided with cuts, the cuts in the collar extend up to between the cuts in the bushing.

When a corrugated bushing is used, a good connection between the bushing and the sealing sleeve is obtained when the outward corrugations extend into apertures or recesses in the wall of the sleeve.

For securing the sleeve, the bushing may alternatively be provided with projections which extend into recesses in the inner surface of the sleeve. Furthermore, one end of the sleeve may be clamped between the bushing and a radially resilient ring secured to the bushing. The parts of the seal are then also kept together when they have not yet been mounted in the socket.

By virtue of the fact that the seal is mounted in the socket under a radial bias, it is insensitive to dimensional variations of the pipes within the tolerance limits.

Some embodiments of the invention will now be described, by way of example, with reference to the accompanying drawings. In said drawings, FIG. 1 shows a perspective elevational view of a portion of the resilient bushing;

FIG. 2 shows a perspective elevational view of a portion of the sealing sleeve;

FIG. 3 shows a longitudinal sectional view of the seal in the assembled condition in pipes in which the clearance between socket and spigot is minimal;

FIG. 4 is a longitudinal sectional view of such seal with the clearance between socket and spigot being maximal;

FIG. 5 shows a perspective view of a portion of the resilient bushing in a modified embodiment;

FIG. 6 shows a perspective elevational view of a snap ring used in the embodiment shown in FIG. 5;

FIG. 7 shows a perspective elevational view of a sealing sleeve used in the embodiment illustrated in FIG. 5;

FIG. 8 shows a longitudinal sectional view of the seal shown in FIGS. 5-7 in the assembled condition with pipes in which the clearance between socket and spigot is minimal; and FIG. 9 shows a longitudinal sectional view of the seal of FIG. 8 with the clearance between socket and spigot being maximal.

The sealing element illustrated in the Figures of the accompanying drawings comprises a sealing sleeve 1 and a radially resilient element 2. The sealing sleeve 1 is made of an elastomeric material, such as rubber, and the resilient element 2 of a resilient material, such as steel or a thermoplastic synthetic resin material, for example polypropylene. The resilient element 2 consists of a bushing 3, which extends into the sleeve and is provided with a collar 4. In the embodiment of FIGS. 1-4, the bushing is of corrugated cross-sectional configuration, and the collar is provided with cuts 5 extending throughout the entire width of the collar and dividing the same into segments 6. The apexes of the outward corrguations 7 are located in the same radial plane as the cuts 5 in collar 4. Segments 6 are connected with the connecting pieces 8 between the corrugations of the bushing (FIG. 1).

The sealing sleeve comprises a cylindrical portion 9, which is provided at one end with a flange 10 formed with recesses 11 for receiving the segments 6 of the collar, and at the other end with a hammerhead-shaped gasket 12. The cylindrical portion is formed with recesses or apertures 13 (FIG. 2).

Element 2 and sleeve 1 are made in separate molds and then secured together by slipping sleeve 1 under bushing 3 until corrugations 7 extend into recesses or apertures 13 and segments 6 come to lie within recesses 11. The resulting sealing element is introduced into the socket 14 of a pipe 15, which can be done mechanically using a press, with collar 4 serving as a bearing surface for the punch of the press. The dimensions of bushing 3 have been selected so that during the introduction of sealing element 1, 2 into socket 14 the bushing is radially depressed. Owing to the resiliency of bushing 3 in the radial direction, the sealing element will then at all times, independently of the inside diameter of the socket within the dimensional tolerance applied in the manufacture of pipe 15, be clamped within socket 14 in such a manner that it can only be removed from the socket when a very large axial force is exerted. The force required for removing sealing element 1, 2 can be increased still further by providing socket 14 with a circumferential groove and the apexes 7 of the corrugations with projections which in the assembled condition extend into such groove, or by locally forcing the wall of recesses 13 of the sealing sleeve into such groove.

Into the socket, the spigot end of a pipe 16 is inserted. During this operation the spigot end is centered by bushing 3. During the introduction of the spigot end it is initially only necessary to overcome the frictional resistance as it slides over the inner surface of bushing 3, and only in the last instance is it necessary to overcome the relatively small resistance for bending the hammerhead-shaped gasket portion 12 to the outside.

FIG. 3 shows the pipe in the assembled condition with the clearance between socket and spigot ends being minimal, and FIG. 4 the situation in which this clearance is maximal. In both cases the seal 1, 2 is biased by resilient bushing 13 into contact with the inner surface of socket 14, and the diameter of bushing 3 with collar 4 is adapted to the inside diameter of socket 14.

In the embodiment shown in FIGS. 5-9, bushing 3 is provided with cuts 17, which extend from the free end of the bushing axially up to the vicinity of collar 4. Collar 4 has radial cuts 18, which extend from its outer circumference up to between the cuts 17 in bushing 3. As a result, bushing 3 can be resiliently depressed in the radial direction, just as in the embodiment of FIGS. 1-4. Bushing 3 is further provided at its free end with outward projections 19, which snap into an annular groove 20 in the inner surface of sealing sleeve 1. After sleeve 1 has been mounted on bushing 3, a snap ring 21 can be applied to the outer surface of sleeve 1. Snap ring 21 is provided on one end with an inward edge 22, which snaps into a groove 23 formed in the outer surface of the sleeve, and on the other end with ridges and grooves 24, which snap into corresponding grooves and ridges 25 on the outer surface of bushing 3. In this manner it is ensured in this embodiment, too, that there is good connection between sleeve 1 and bushing 3 in the non-mounted condition. In this embodiment, sealing sleeve 1 has a cylindrical extension 26 which after the assembly of the pipes is forced by hammerhead 12 into contact with the inner surface of socket 14. Snap ring 21 is also resiliently deformable in the radial direction as a result of the axial cuts 27 and 28.

I claim:

1. A seal for use with pipes to be inserted one into another by means of spigot and socket ends comprising a sealing sleeve made of an elastomeric material, said sleeve being clamped within the socket by a radially resilient bushing provided with outward corrugations extending parallel to the axis of said bushing, said bushing is provided with a collar which is segmented by cuts extending throughout the entire width of said collar.

2. A seal according to claim 1 wherein the sealing sleeve comprises a cylindrical portion provided with recesses extending parallel to the axis of said cylindrical portion, a hammerhead-shaped gasket at one end of the sealing sleeve and a flange at the other end of the sealing sleeve provided with recesses extending throughout the entire width of said flange.

3. A seal according to claim 2 wherein the outward corrugations of the radially resilient bushing extend into the recesses of the cylindrical portion of the sealing sleeve.

4. A seal according to claim 2 wherein the segments of the collar extend into the recesses of the flange of the sealing sleeve.

5. A seal according to claim 1 wherein the outward corrugations of the radially resilient bushing are located in the same radial plane as the cuts of the collar.

6. A seal according to claim 1 which comprises a radially biased mounting means.

* * * * *

UNITED STATES PATENT AND TRADEMARK OFFICE
CERTIFICATE OF CORRECTION

PATENT NO. : 4,394,024
DATED : July 19, 1983
INVENTOR(S) : Johannes C. Delhaes

It is certified that error appears in the above-identified patent and that said Letters Patent are hereby corrected as shown below:

Column 1, line 18, "making connections" should read as --making pipe connections--.

Signed and Sealed this

First Day of November 1983

[SEAL]

Attest:

GERALD J. MOSSINGHOFF

Attesting Officer

Commissioner of Patents and Trademarks